United States Patent [19]

Efraim et al.

[11] Patent Number: 5,552,126
[45] Date of Patent: Sep. 3, 1996

[54] CO-PRODUCTION OF POTASSIUM SULFATE, SODIUM SULFATE AND SODIUM CHLORIDE

[75] Inventors: Itzhak Efraim, Omer; Shalom Lampert, Maalot; Curt Holdengraber, Qiryat Tivon, all of Israel

[73] Assignee: Dead Sea Works Ltd., Beer Sheva, Israel

[21] Appl. No.: 348,118

[22] Filed: Nov. 28, 1994

[51] Int. Cl.$^6$ .................................................... C01D 5/00
[52] U.S. Cl. ........................................ 423/199; 423/552
[58] Field of Search ................................... 423/552, 199

[56] References Cited

U.S. PATENT DOCUMENTS

| | | | |
|---|---|---|---|
| 1,936,070 | 11/1933 | Ritchie et al. | 423/552 |
| 1,990,896 | 2/1935 | Connell | 423/552 |
| 4,215,100 | 7/1980 | Sokolov et al. | 423/552 |

FOREIGN PATENT DOCUMENTS

| | | | |
|---|---|---|---|
| 244540 | 12/1985 | German Dem. Rep. | |
| 710945 | 1/1980 | U.S.S.R. | 423/552 |
| 806606 | 2/1981 | U.S.S.R. | 423/552 |
| 1557102 | 4/1990 | U.S.S.R. | 423/552 |
| 410830 | 5/1934 | United Kingdom | 423/552 |
| 439287 | 11/1935 | United Kingdom | 423/552 |
| 460281 | 1/1937 | United Kingdom | 423/552 |
| 287511 | 9/1964 | United Kingdom | 423/199 |

OTHER PUBLICATIONS

Scherzberg, H.; Schmitz, R. and Wholle, W.; Phosphorus and Potassium No. 178 (1992), 20–26.

*Primary Examiner*—Wayne Langel
*Attorney, Agent, or Firm*—Mark M. Friedman

[57] ABSTRACT

A process for producing potassium sulfate, sodium sulfate, and sodium chloride from potash and a sodium sulfate/water source, which includes: (a) treating the sodium sulfate/water source to produce a slurry containing anhydrous sodium sulfate; (b) concentrating the slurry to form a concentrate and a diluent; (c) treating the diluent to precipitate out anhydrous sodium sulfate; (d) subjecting the anhydrous sodium sulfate from steps (b) and/or (c) and/or from a different source to conversion with potash in an aqueous medium to yield glaserite and a first mother liquor, with any excess anhydrous sodium sulfate being taken as co-product; (e) converting the glaserite with potash and water to produce a precipitate of potassium sulfate and a second mother liquor; (f) returning the second mother liquor to step (d); (g) subjecting the first mother liquor to evaporative crystallization such that substantially pure sodium chloride is precipitated in a third mother liquor; and (h) returning the third mother liquor for conversion to potassium salts.

9 Claims, 2 Drawing Sheets

CO-PRODUCTION OF POTASSIUM SULFATE, SODIUM SULFATE AND SODIUM CHLORIDE

FIELD AND BACKGROUND OF THE INVENTION

The present invention relates to processes for producing potassium sulfate, and more particularly, to processes for producing potassium sulfate, sodium sulfate and sodium chloride from potash and a source of sodium sulfate.

Sodium Sulfate Production

Various processes are known for producing sodium sulfate from hydrated sources of sodium sulfate. High-quality commercial grades of sodium sulfate are usually produced from Glauber's salt ($Na_2SO_4 \cdot 10H_2O$). Glauber's salt is obtained from natural deposits ("mirabilite") existing in various cold climates. Glauber's salt is also produced by cooling a natural brine, a solution obtained by solution-mining, or a process stream. The cooling is effected in ponds or in crystallizers (surface-cooled or vacuum-cooled).

Anhydrous sodium sulfate is typically produced from Glauber's salt by evaporative crystallization in a multiple-effect or mechanical vapor recompression (MVR) evaporator, by dehydration in a rotary dryer, or by melting followed either by evaporation or by salting out with sodium chloride. The melting of Glauber's salt to precipitate anhydrous sodium sulfate generally produces an unacceptably fine product material. Moreover, Glauber's salt often contains insoluble matter which is unacceptable in high grade anhydrous sodium sulfate. Hence, dissolution, filtration (and auxiliary separation methods such as desliming), and evaporative crystallization operations are necessary to obtain material of the proper quality. Generally, some mother liquor is purged in order to keep impurities from precipitating out with the product. Alternatively, the Glauber's salt can be melted to produce low-quality "salt-cake" grade sodium sulfate. The saturated mother liquor is then filtered and evaporated to produce high-grade sodium sulfate.

Potassium Sulfate Production

In the production of potassium sulfate from potash and sodium sulfate, thermodynamic and economic constraints dictate that the potassium sulfate be produced in two stages. In conventional processes, these stages consist of:

1) Production of glaserite ($K_3Na(SO_4)_2$) from sodium sulfate, potash, and Stage 2 liquor;

2) Production of potassium sulfate from potash, water, and glaserite from Stage 1;

The mother liquor produced in Stage 1 contains substantial quantities of dissolved potassium and sulfate, which generally warrants a recovery operation. The currently-known processes differ primarily in the scheme used to retrieve these potassium and sulfate values.

Several processes (hereinafter "Type I" processes) take advantage of the different solubility behaviors of potassium chloride, sodium chloride, and sodium sulfate/Glauber's salt at high and low temperatures. The effluent from Stage 1, of composition 'a' (at 25° C.) (see FIG. 1b), is cooled to about 0° C., precipitating Glauber's salt for reuse and possibly some sodium chloride, depending on the water balance in the system. The potassium values are concentrated in the aqueous phase.

After separation, the solution is evaporated at high temperature, yielding sodium chloride and further concentrating the potassium ions in solution. The sodium chloride is removed as the process by-product, and the hot liquor is cooled, precipitating potassium as KCl and/or glaserite, which is subsequently returned to the reaction stages. Alternatively, the hot brine is reacted with Glauber's salt recovered from the cooling crystallization stage to produce a glaserite suspension, which is returned to Stage 1.

Other cyclic processes (hereinafter "Type II" processes) take advantage of the different solubility behaviors of potassium chloride and sodium chloride at high temperatures. The quantity of water added to the reaction stages is set such that glaserite and solution 'b' (at 25° C.) are produced (FIG. 1b). The glaserite is then reacted with potash and water to produce the potassium sulfate product and a liquor of composition 'c' (at 25° C.). The liquor is returned to Stage 1. The effluent liquor from Stage 1 is evaporated at high temperatures (75°–110° C.), producing pure NaCl, and the end liquor is returned to Stage 1.

It must be emphasized that the production of potassium sulfate from potash and sodium sulfate is a low value-added process, even when the sodium chloride by-product can be marketed. The multi-stage processes described above are both capital-intensive and energy-intensive.

The Type I processes are particularly complex, requiring a large number of unit operations. These include 4 to 6 filtration steps, not including filtration of the washed potassium sulfate product. Moreover, cooling crystallization is used to bring the temperature of the Stage 1 effluent to 0° C. The heat of crystallization of Glauber's salt, which is substantial (18.4 kcal/m), must also be removed at low temperatures. The cooling and heating costs associated with this stage, coupled with expensive equipment (such as crystallizers, heat exchangers, coolant system, and the like) are a serious disadvantage.

The Type II processes have no cooling stage below ambient conditions. However, the recycle stream is much larger (~10 tons per ton $K_2SO_4$ produced), which increases energy consumption. The low ratio of water evaporated to throughput in the evaporative crystallization stage drastically reduces the natural slurry density, requiring larger crystallizers and/or more sophisticated crystallization technology.

Although Glauber's salt is a relatively inexpensive source of sodium sulfate, the additional water from the Glauber's salt decreases the conversion in the reaction stages and increases the sulfate composition of the Stage 1 effluent. Some cyclic processes cannot be operated using Glauber's salt while others require additional unit operations (for example, evaporation).

To date, there is no economically viable industrial process for producing agricultural-grade potassium sulfate from sodium sulfate or Glauber's salt.

Thus, there is a widely recognized need for, and it would be highly advantageous to have, a process for producing potassium sulfate from sodium sulfate which would be more efficient and more economical that heretofore known.

SUMMARY OF THE INVENTION

According to the present invention there is provided a process for producing potassium sulfate, sodium sulfate, and sodium chloride from potash and a sodium sulfate/water source, comprising the steps of: (a) treating the sodium sulfate/water source to produce a slurry containing anhydrous sodium sulfate; (b) concentrating the slurry to form a concentrate and a diluent; (c) treating the diluent to precipitate out anhydrous sodium sulfate; (d) subjecting the anhydrous sodium sulfate from steps (b) and/or (c) and/or from a different source to conversion with potash in an aqueous medium to yield glaserite and a first mother liquor, with any excess anhydrous sodium sulfate being taken as co-product; (e) converting the glaserite with potash and water to produce a precipitate of potassium sulfate and a second mother liquor; (f) returning the second mother liquor to step (d); (g) subjecting the first mother liquor to evaporative crystallization such that substantially pure sodium chloride is precipitated in a third mother liquor; and (h) returning the third mother liquor for conversion to potassium salts.

According to further features in preferred embodiments of the invention described below, the aqueous sodium sulfate solution is treated by evaporative crystallization or by outsalting with sodium chloride.

The present invention successfully addresses the shortcomings of the presently known configurations by providing a process for the integrated production of potassium sulfate and sodium chloride with sodium sulfate, from potash and Glauber's salt, which is an inexpensive and available source of sodium sulfate. The use of Glauber's salt along with the co-production of high-grade sodium sulfate reduces raw material costs and boosts total product value, such that the value-added is very nearly doubled.

The present invention makes use of salt-cake grade sodium sulfate, which can be produced in-situ, to obtain the potassium sulfate product. In addition to reducing the evaporation load, the integrated process allows for a more efficient utilization of energy resources, including waste vapors. In addition, the purging of sodium sulfate mother liquor is eliminated or substantially reduced.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a process for the integrated production of potassium sulfate and sodium chloride with sodium sulfate, from potash and a sodium sulfate/water source, where the sodium sulfate/water source may be a low quality water containing sodium sulfate, such as Glauber's salt or semi-anhydrous sodium sulfate, i.e., a mixture of sodium sulfate and Glauber's salt or partially hydrated sodium sulfate.

The principles and operation of a process according to the present invention may be better understood with reference to the drawings and the accompanying description.

To illustrate the advantages and benefits of the proposed invention, it is instructive to consider two separate processes in which potassium sulfate is produced from potash and Glauber's salt and sodium sulfate is produced from Glauber's salt.

The use of Glauber's salt as the sole source of sodium sulfate in the production of potassium sulfate is problematic in currently known processes. Some cyclic processes cannot be operated using Glauber's salt, or require additional unit operations (for example, evaporation). In other processes, the use of Glauber's salt greatly increases the volume of internal streams and the amount of Glauber's salt that must be recovered by expensive cooling-crystallization.

In currently known processes, the evaporation load in the potassium recovery stage is increased to ~3.0–3.5 tons per ton of potassium sulfate produced, all of which is evaporated at high temperature in chloride-rich solutions and requires expensive construction materials, such as monel or titanium. Thus, the known processes which are able to utilize Glauber's salt are even more capital intensive and energy intensive than processes which consume anhydrous sodium sulfate.

Assuming that the Glauber's salt is completely dissolved in order to produce high purity sodium sulfate with the requisite size distribution, the evaporation load is ~2.3 tons per ton of anhydrous sodium sulfate produced. The combined evaporation load is ~5.5 tons per ton of each product produced in separate processes.

Figures 1A, 1B, 1C:
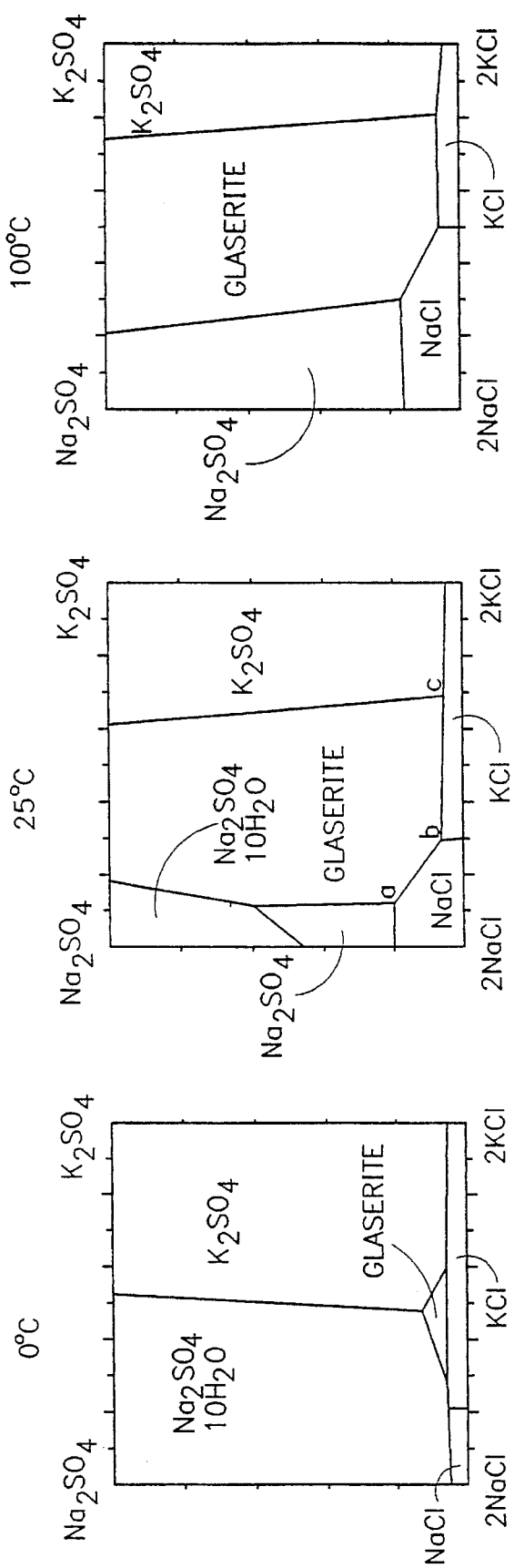
FIGS. 1a, 1b and 1c are solution phase diagrams for the $Na_2SO_4/2NaCl/K_2SO_4/2KCl/H_2O$ system at 0°, 25° and 100° C., respectively.
Figure 2:
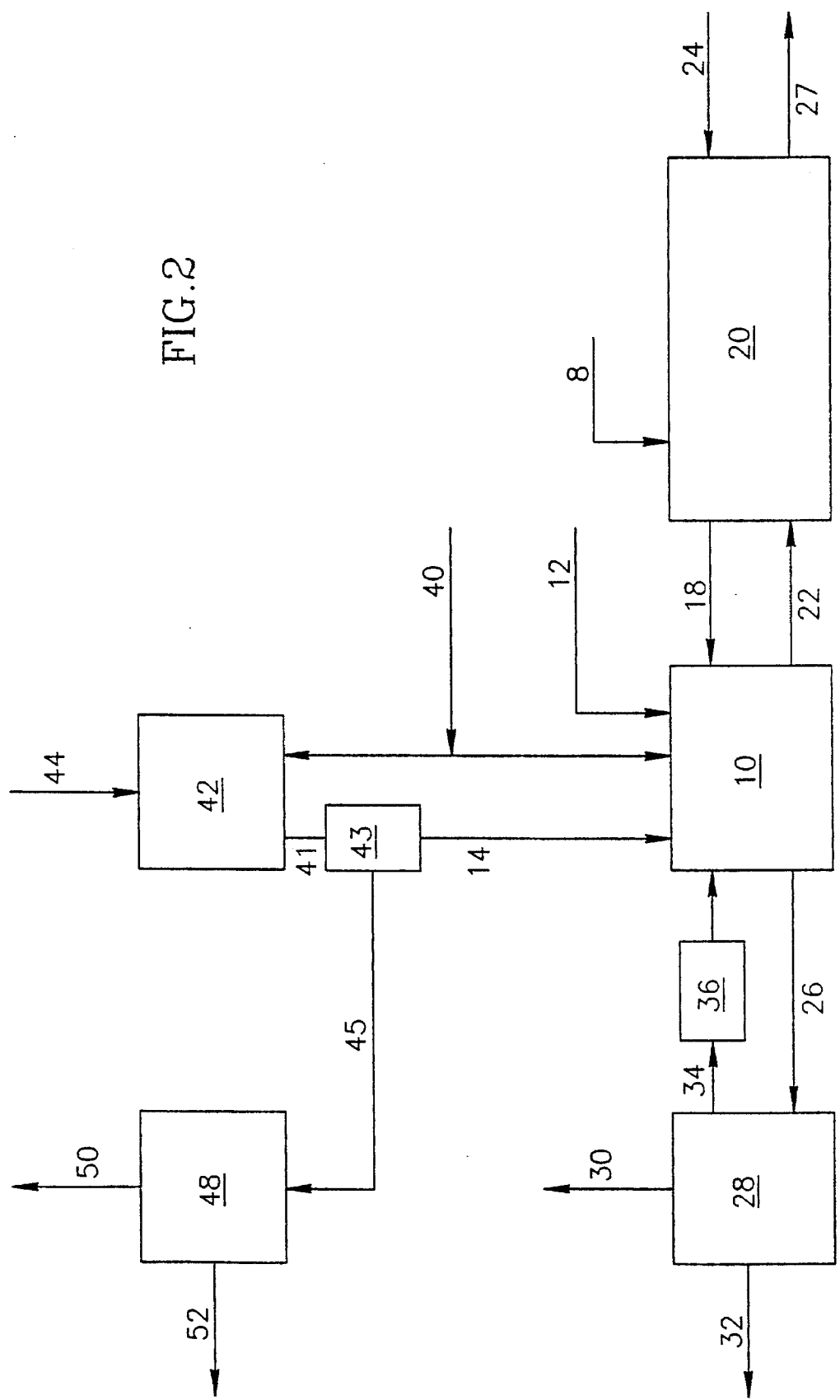
FIG. 2 is a block diagram schematically depicting processes according to the present invention.

A block diagram of the proposed process is provided, by way of example, in FIG. 2. The anhydrous sodium sulfate produced in the melter is of sufficient quality for producing agricultural grade potassium sulfate, such that the evaporation load for the integrated process is only 4.6–4.8 tons per ton of each of potassium sulfate and sodium sulfate. In addition, the evaporative crystallization stages can be linked, with waste vapor from one stage being fed to the other, which reduces the total amount of waste vapor in the system. Moreover, in the melting stage, the heat requirement nearly doubles relative to each individual process. Thus, in a process according to the present invention described below, the available waste vapor and low-pressure vapor requirements are much more balanced, reducing the cost of cooling water, condensers, and the like. Similarly, more fundamental energy optimization possibilities exist for the integrated process, including cogeneration of steam and electricity and/or use of mechanical vapor recompression for at least one of the evaporation systems.

In a process according to the present invention, the capital cost of services (such as steam, hot water, cooling water) and process control are reduced because a single system is needed rather than two. The drying, storage, and transport of sodium sulfate produced in the melter are eliminated. No purging of the sodium sulfate solutions is needed since impurities generally precipitate out with the sodium sulfate produced in the melter. Thus, the sodium sulfate yield increases.

With reference to FIG. 2, a process according to the present invention is as follows: The conversion of potash and sodium sulfate is carried out in two stages. In the first stage 10, the reaction is effected at from about 15° to about 60° C., with the preferred temperature range being from about 20° to about 40° C. Potash 12, sodium sulfate 14, slurry 34 from the recovery stage, and brine 18 from the glaserite decomposition stage 20 are introduced. The sodium sulfate source is primarily or exclusively anhydrous sodium sulfate, but some Glauber's salt and/or aqueous sodium sulfate is added. Each of the above-referenced, alone or in combination, is referred to hereinafter singly or collectively as "sodium sulfate/water source". The term 'potash' is meant to indicate any potassium chloride containing material including, for example, sylvinite.

The sodium sulfate and potash dissolve, generating a supersaturation with respect to glaserite, such that glaserite is precipitated. The system can also be supersaturated with respect to sodium chloride, such that some sodium chloride is co-precipitated. The slurry is concentrated and delivered 22 to the glaserite decomposition stage 20. The mother liquor 26 is saturated with respect to glaserite and should approach saturation with sodium chloride and/or potassium chloride under ideal conditions. A typical mother-liquor composition has the following composition: potassium-6 wt %; sodium-8 wt %; chloride-17 wt %; sulfate-1.5 wt %; water—the balance. The substantial quantities of potassium and sulfate in the mother liquor are returned to the process in the recovery stage.

The glaserite decomposition stage 20 is performed at from about 15° to about 60° C., with the preferred temperature range being from about 20° to about 35° C. Water 24 is introduced along with the solids 22 obtained from the first stage 10. Potash is introduced directly 8 and/or via stream 22 by introducing excess potash into stage 10. The potash and glaserite solids dissolve, generating a supersaturation solely with respect to potassium sulfate, such that potassium sulfate is selectively precipitated. The maximum conversion is obtained when the mother liquor composition approaches the $KCl/K_2SO_4$/glaserite/$H_2O$ invariant point. The potassium sulfate solids are separated, washed and dried to give a potassium sulfate product 27. The mother liquor 18 removed from the reactor is returned to the glaserite production stage 10. The spent washwater, however, is used in the decomposition of glaserite. Some or all of portions of stages 10 and 20 may be effected in a single countercurrent differential contactor.

The brine 26 produced in the production of glaserite 10 is evaporated in an evaporative crystallizer 28, at about 70° to about 130° C., with the preferred range being about 95° to about 110° C. If necessary, the brine 26 can be filtered prior to evaporation to remove any insoluble matter. The removal of water 30 produces a supersaturation of sodium chloride, which precipitates out of solution. Care must be taken not to overevaporate, which can result in the undesirable co-precipitation of glaserite.

After a solid/liquid separation, the wet sodium chloride product 32 is removed from the system. The potassium-enriched brine 34 is cooled 36 and returned to vessel 10.

The sodium sulfate introduced to vessel 10 is produced in-situ in a melter 42 by melting the Glauber's salt feed 40. Water 44 is added as needed. The product slurry 41 can be concentrated in vessel 43. The concentrate 14 is fed to vessel 10 and the diluent 45 is returned to evaporator 48. The diluent can be filtered before being evaporated to remove the water 50. The solids 52 are dried to produce anhydrous sodium sulfate product.

While the invention has been described with respect to a limited number of embodiments, it will be appreciated that many variations, modifications, and other applications of the inventions can be made.

What is claimed is:

1. A process for producing potassium sulfate, sodium sulfate, and sodium chloride from potash and a sodium sulfate/water source, comprising the steps of:

(a) treating the sodium sulfate/water source to produce a slurry containing anhydrous sodium sulfate;

(b) concentrating said slurry to form a concentrate and a diluent;

(c) treating said diluent to precipitate out anhydrous sodium sulfate;

(d) taking a portion of said anhydrous sodium sulfate from steps (b) and/or (c) as co-product, leaving a remainder of said anhydrous sodium sulfate from steps (b) and/or (c);

(e) subjecting said remainder of said anhydrous sodium sulfate from steps (b) and/or (c) to conversion with potash in an aqueous medium to yield glaserite and a first mother liquor;

(f) converting said glaserite with potash and water to produce a precipitate of potassium sulfate and a second mother liquor;

(g) returning said second mother liquor to step (e);

(h) introducing said first mother liquor directly to evaporative crystallization such that sodium chloride is precipitated in a third mother liquor; and (i) returning said third mother liquor for conversion to potassium salts.

2. A process according to claim 1, wherein said diluent is treated by evaporative crystallization.

3. A process according to claim 1, wherein said diluent is treated by outsalting with sodium chloride.

4. A process according to claim 1, wherein the sodium sulfate produced from said diluent is used as raw material for step (d), with any excess solid sodium sulfate being removed as co-product.

5. A process according to claim 1, wherein Glauber's salt is added to said third mother liquor in, or prior to, step (d).

6. A process according to claim 1, wherein said sodium sulfate used in step (d) is a low-quality salt-cake, such that all the high-grade sodium sulfate produced in steps (a) and (c) is removed as co-product.

7. A process according to claim 1, wherein the sodium sulfate/water source is Glauber's salt.

8. A process according to claim 7, wherein said treating includes melting.

9. A process according to claim 1, wherein the sodium sulfate/water source is semi-anhydrous sodium sulfate.

\* \* \* \* \*